E. SEIBEL.
Seed Planter.
No. 86,457. Patented Feb. 2, 1869.
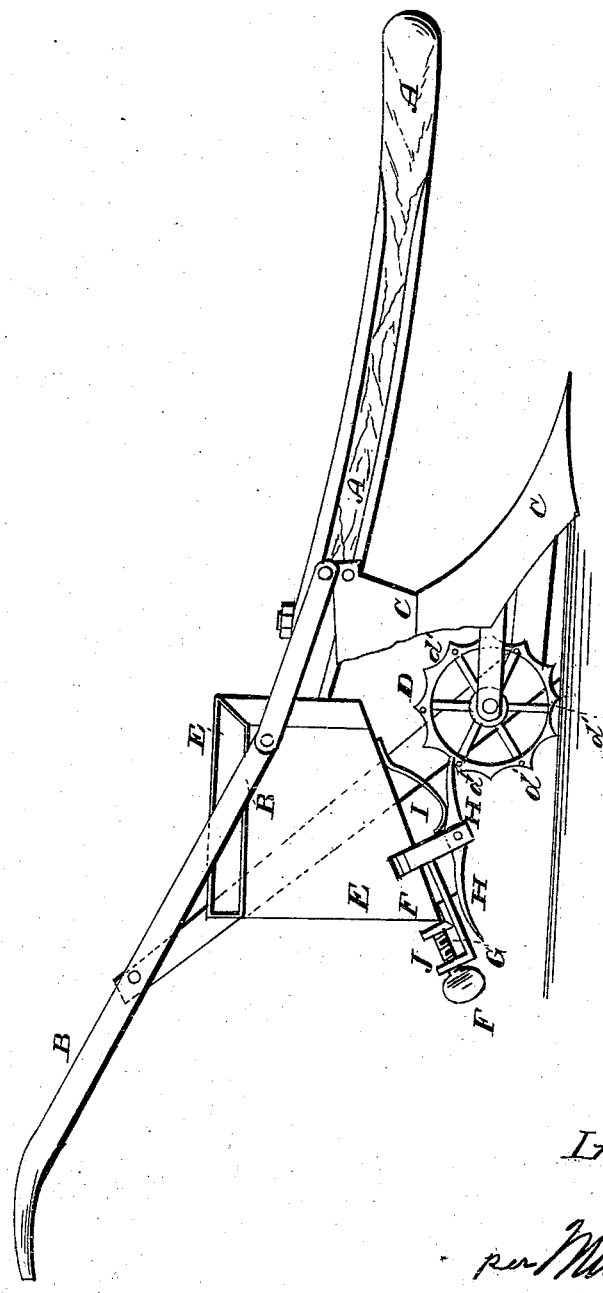

EMANUEL SEIBEL, OF WITTENBURG, MISSOURI.

Letters Patent No. 86,457, dated February 2, 1869.

IMPROVEMENT IN COMBINED SEED-PLANTER AND PLOW.

The Schedule referred to in these Letters Patent and making part of the same.

*To all whom it may concern:*

Be it known that I, EMANUEL SEIBEL, of Wittenburg, in the county of Perry, and State of Missouri, have invented a new and improved Combined Seed-Planter and Plow; and I do hereby declare that the following is a full, clear, and exact description thereof, which will enable those skilled in the art to make and use the same, reference being had to the accompanying drawings, forming part of this specification, in which—

Figure 1 is a side view of a plow illustrating my invention, part of the mould-board being broken away to show the construction.

My invention has for its object to furnish an improved machine for attachment to plows, by means of which the seed may be planted as the furrow is opened by the plow, which shall be so constructed as to operate automatically, dropping the seed wherever the plow can go, being thus especially adapted for use in new, stumpy, or rough ground; and It consists in the construction and combination of the various parts of the machine, as hereinafter more fully described.

A is the beam,

B are the handles, and

C is the mould-board of the plow, about the construction of which parts there is nothing new.

D is a wheel, the journals of which revolve in bearings in the frame of the plow, or in supports attached to said plow, in such a position that the face of said wheel may come in contact with the ground in the bottom of the furrow, so as to be revolved by said contact. The face of the wheel D should be corrugated, or toothed, to enable it to take a surer hold upon the ground, and prevent its slipping thereon.

Upon the side of the wheel D are formed projections or teeth, $d'$, which strike against and operate the lever-valve of the hopper, or seed-box.

E is the seed-box, or hopper, which is securely attached to the frame of the plow, and which is provided with an opening through its bottom.

F is a slide, securely attached to the bottom of the hopper E, and which is formed with a hole through it corresponding with the hole through the bottom of the hopper E.

G is a plate, sliding in a groove in the upper side of the slide F, and which has a hole through it, for the passage of the seed, so that by adjusting the position of the said sliding plate G, the size of the discharging-orifice may be adjusted at pleasure.

The opening upon the outer side of the slide F is closed by a valve, H, which is pivoted to supports attached to the bottom of the hopper E, and the forward end of which extends forward into such a position as to be struck and operated by the projections or teeth $d'$ upon the side of the wheel D, as hereinbefore described.

I is a spring, attached to the bottom of the hopper E, in such a position that its free end may rest against the valve H and hold it up against the discharge-orifice, to prevent the escape of the seed except when the said valve is operated by the said wheel D.

The sliding plate G is moved back and forward, to adjust it, by means of the screw J, the forward end of which is swivelled to an arm or flange upon the rear end of the said sliding plate G, and which passes through an arm or flange upon the rear end of the slide F.

I claim as new, and desire to secure by Letters Patent—

The combination of the wheel D, having projections or teeth $d'$ formed upon its side, valve H, spring I, slide G, slide-plate F, swivelled screw J, and hopper or seed-box E, with each other and with an ordinary plow, substantially as herein shown and described, and for the purpose set forth.

EMANUEL SEIBEL.

Witnesses:
G. F. SCHMIDT,
FRIEDRICH GRASS.